United States Patent [19]
Smith et al.

[11] Patent Number: 5,908,575
[45] Date of Patent: Jun. 1, 1999

[54] METHOD OF INDUCTIVELY FUSION JOINING PLASTIC PIPES

[75] Inventors: Cin Smith, Los Altos; Goran Perica, Menlo Park; Randy J. Bleske, San Jose; Steve Kinney, Sunnyvale, all of Calif.

[73] Assignee: Gas Research Institute, Chicago, Ill.

[21] Appl. No.: 08/857,876

[22] Filed: May 16, 1997

[51] Int. Cl.⁶ .................................................. H05B 6/08
[52] U.S. Cl. ..................... 219/633; 219/661; 219/667; 285/288.1
[58] Field of Search .................... 219/633, 634, 219/643, 660, 661, 667, 110, 611; 285/288.1

[56] References Cited

U.S. PATENT DOCUMENTS

| | | |
|---|---|---|
| 3,770,928 | 11/1973 | Kornrumf et al. . |
| 3,806,791 | 4/1974 | Johnson . |
| 3,814,888 | 6/1974 | Bowers et al. . |
| 3,843,857 | 10/1974 | Cunningham . |
| 4,017,701 | 4/1977 | Mittelmann . |
| 4,032,740 | 6/1977 | Mittelmann .............................. 219/667 |
| 4,097,863 | 6/1978 | Chambers . |
| 4,253,139 | 2/1981 | Weiss . |
| 4,471,196 | 9/1984 | Frank et al. . |
| 4,616,305 | 10/1986 | Damiano et al. . |
| 4,636,927 | 1/1987 | Rhyne et al. . |
| 4,652,985 | 3/1987 | Bouglé . |
| 4,656,570 | 4/1987 | Swoboda . |
| 4,685,041 | 8/1987 | Bowman et al. . |
| 4,775,821 | 10/1988 | Sikora . |
| 4,885,447 | 12/1989 | Sánchez González . |
| 4,918,292 | 4/1990 | Nussbaum et al. . |
| 4,954,753 | 9/1990 | Sikora . |
| 5,138,136 | 8/1992 | Moreau et al. . |
| 5,255,178 | 10/1993 | Liberati . |
| 5,274,541 | 12/1993 | Kimura et al. . |
| 5,343,023 | 8/1994 | Geissler . |
| 5,414,247 | 5/1995 | Geithman et al. ........................ 219/667 |
| 5,466,916 | 11/1995 | Iguchi et al. ............................. 219/633 |
| 5,601,741 | 2/1997 | Thommes . |

FOREIGN PATENT DOCUMENTS

| | | |
|---|---|---|
| 2-196629 | 8/1990 | Japan . |
| 6-284736 | 10/1994 | Japan . |
| 7-323479 | 12/1995 | Japan . |
| 8-258153 | 10/1996 | Japan . |
| 9-024548 | 1/1997 | Japan . |
| 8002124 | 10/1980 | WIPO . |

OTHER PUBLICATIONS

Smartheat Fittings For Joining Polyethylene Gas Pipe: Tests, Field Trials and Advancements; Cin Smith, Metcal Inc., Menlo Park, CA, and Mike Zandaroski, Minnegasco, (a Division of Arkla, Inc.), Minneapolis, Minn. (Apr. 1994).

Smartheat Fittings For Joining Polyethylene Gas Pipe: Tests, Field Trials and Advancements; Cin Smith, Raychem Inc., Menlo Park, CA (Jan. 1996).

*Primary Examiner*—Philip H. Leung
*Attorney, Agent, or Firm*—Pauley Peterson Kinne & Fejer

[57] ABSTRACT

A method and apparatus for fusion joining polyethylene pipe. A power source supplies an input power to an input of a power supply. The input power has generally constant current and is converted to an output power at a relatively high frequency. The relatively high frequency output power is delivered to an installation tool. The output power delivered to the installation tool is controlled. The output power can be controlled as a function of ambient temperature surrounding the installation tool.

9 Claims, 3 Drawing Sheets

METHOD OF INDUCTIVELY FUSION JOINING PLASTIC PIPES

BACKGROUND OF THE INVENTION

1. Field of the Invention

This invention relates to a method and apparatus for fusion joining polyethylene pipe using a frequency converter and/or power supply mounted within a housing that can be easily moved to an installation site. Many different suitable power sources can be used to feed the power supply with an input power. The power source, such as a generator on a truck, conventional line power or a battery pack, can be located remote from the installation site.

2. Description of Prior Art

Many different methods and apparatuses exist for fusion joining polyethylene pipe, such as with electrofusion fittings or induction fusion fittings. In conventional electrofusion methods, a pipe coupling or other fitting normally has a wire coil molded within the coupling or other fitting. Electrical leads, contacts or electrodes are often mounted on an external portion of the coupling body, for electrical contact access. In a typical conventional electrofusion procedure for axially joining two pipes, each pipe end portion is cleaned, scraped and then positioned within a coupling receiver. A clamp is often used to secure or hold the pipe with respect to the coupling. Power is supplied directly to a wire coil molded within the coupling. The wire coil then transfers heat to the polyethylene material and fuses the coupling material directly to the pipe material.

In conventional induction fusion procedures, a rigid heater element is molded within the coupling or other fitting. The coupling provides no direct access to external contacts or electrodes electrically connected to the rigid heater element. Current flow through the rigid heater element is generated by induction from a primary coil within an application tool that is positioned around the coupling or other fitting. Normally, a high frequency current is delivered to the application tool for a predetermined time period. A primary coil within the application tool is energized and then induces a secondary current within the rigid heater element. The temperature of the rigid heater element increases to a generally constant value and then the polyethylene material or other plastic material surrounding the rigid heater element fusion bonds the polyethylene or other plastic material of the pipe and the coupling or other fitting.

In many conventional processes associated with either electrofusion or induction fusion heating, the power delivered to the wire coil of an electrofusion fitting or a heater element of an induction fusion fitting, necessitates relatively heavy gauge or large cables that must be relatively short, due to the high current and high frequency power waveform transmitted through the cables. Thus, it is often necessary to position the power source relatively close to an installation site or fusion site. Quite often significant amounts of labor and time are necessary to setup and breakdown power equipment necessary to deliver power requirements demanded by the installation tool.

There is an apparent need for a method and apparatus that can be more conveniently used at an installation site or a fusion site.

SUMMARY OF THE INVENTION

It is one object of this invention to provide a method and apparatus for fusion joining polyethylene pipe, using a power source that can be remotely located with respect to a fusion site.

It is another object of this invention to provide a method and apparatus for fusion joining polyethylene pipe wherein a variety of power sources can be used to supply input power.

It is another object of this invention to provide an apparatus for fusion joining polyethylene pipe which houses a power supply, a frequency converter and/or a controller within a relatively small and lightweight housing that can be easily moved to a fusion site.

The above and other objects of this invention are accomplished with a method and apparatus for fusion joining polyethylene pipe which uses either an AC or a DC power source, a power supply, a frequency converter, a controller, relatively long lighter gage input cables between the power supply and the controller, and relatively short output cables. By housing the controller in a container or casing that can be easily transported, a relatively short output cable can be connected between the housing and the installation tool while a relatively long lighter gage cable can be used to deliver input power from the power supply to the controller.

Because the input power is delivered at a relatively high frequency and relatively low current, the input cables can be relatively lightweight, of a lighter gage. Thus, the input power can be delivered through inexpensive and low maintenance cables.

With the method and apparatus according to one preferred embodiment of this invention, the power source and the power supply can be remotely located at or near a truck, a building or any other remote location that offers a suitable power source. Alternatively, a power source comprising a battery pack can be locally positioned near or in the housing for the power supply, to furnish the input power.

Although the method and apparatus according to this invention is particularly suitable for fusion joining polyethylene pipe, it is apparent that the method and apparatus can be used to join other plastic or non-plastic pipes, couplings or even other shapes of pipe fittings, plates or any other suitable materials that require fusion joining.

The method and apparatus of this invention provide a system that operates at a relatively low cost and is easy to handle in the field, for installing and repairing polyethylene service pipes, such as those transmitting natural gas. The method and apparatus of this invention can be easily adapted to fuse: low and high volume T-fittings, such as those in a range of approximately 1¼ inch to 8 inch, for electrofusion service; service outlets, such as those in a range of approximately ½ inch to 2 inch for induction fusion or electrofusion service; and relatively smaller couplers, such as those in a range of approximately ½ inch to 2 inch for induction fusion or electrofusion service.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 1:
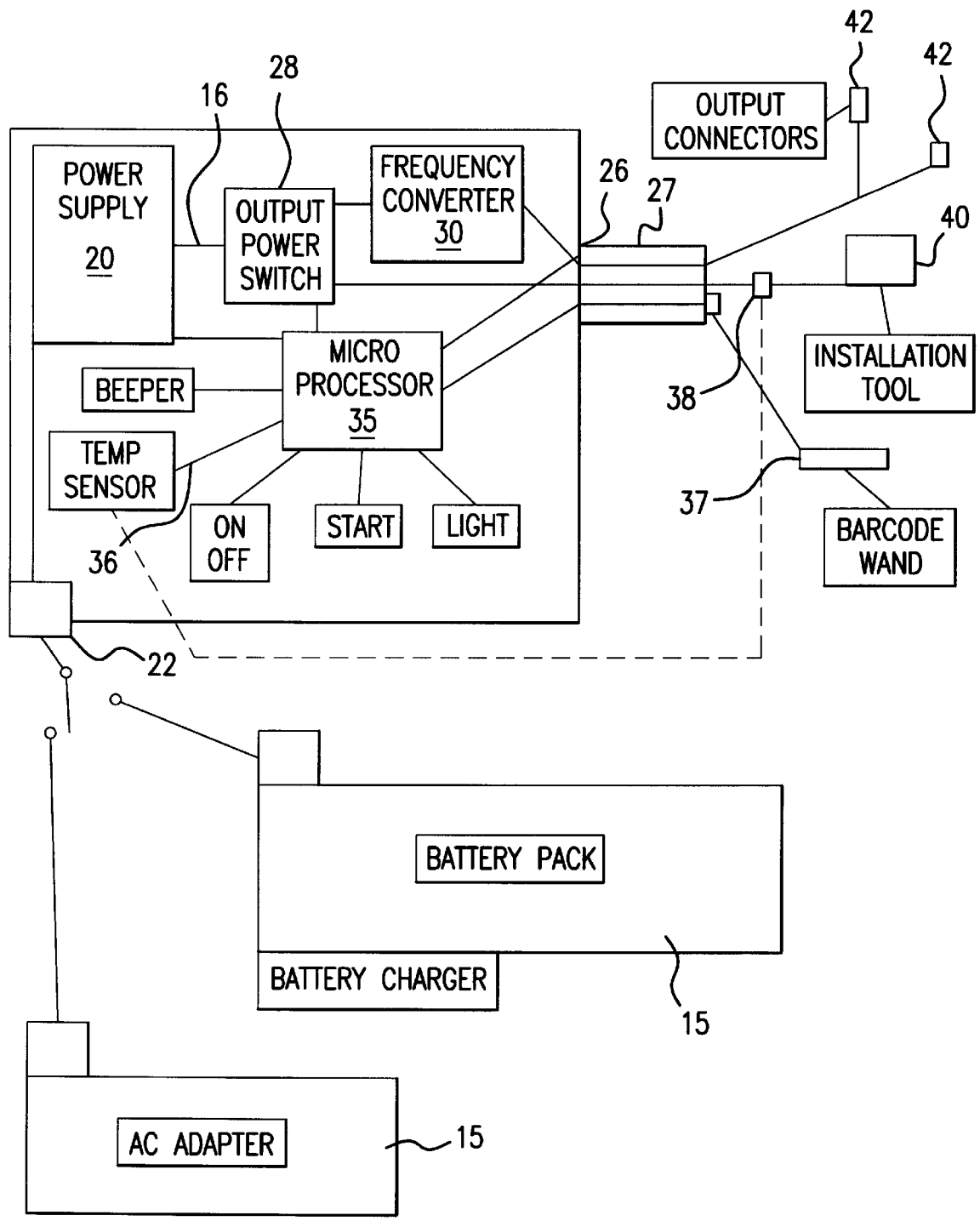
FIG. 1 is a block diagram of a method and apparatus for fusion joining polyethylene pipe.

FIG. 1 shows a block diagram illustrating a method for fusion joining polyethylene pipe, according to one preferred embodiment of this invention. As shown in FIG. 1, power source 15 supplies input power to input 22 of power supply 20. One advantageous feature of this invention relates to the versatility associated with using different AC or DC power sources for supplying the input power. Power source 15 may comprise a battery pack, preferably but not necessarily a rechargeable battery pack, an AC adaptor, such as one powered by a generator or an inverter, or any other suitable DC power source known to those skilled in the art. When the power source is a rechargeable battery, it is possible to obtain as many as about 30 fusions before it is necessary to recharge the battery. Alternatively, power source 15 may comprise a conventional 110V AC source, such as conventional power lines, generator outputs or any other suitable AC source.

Figure 2:
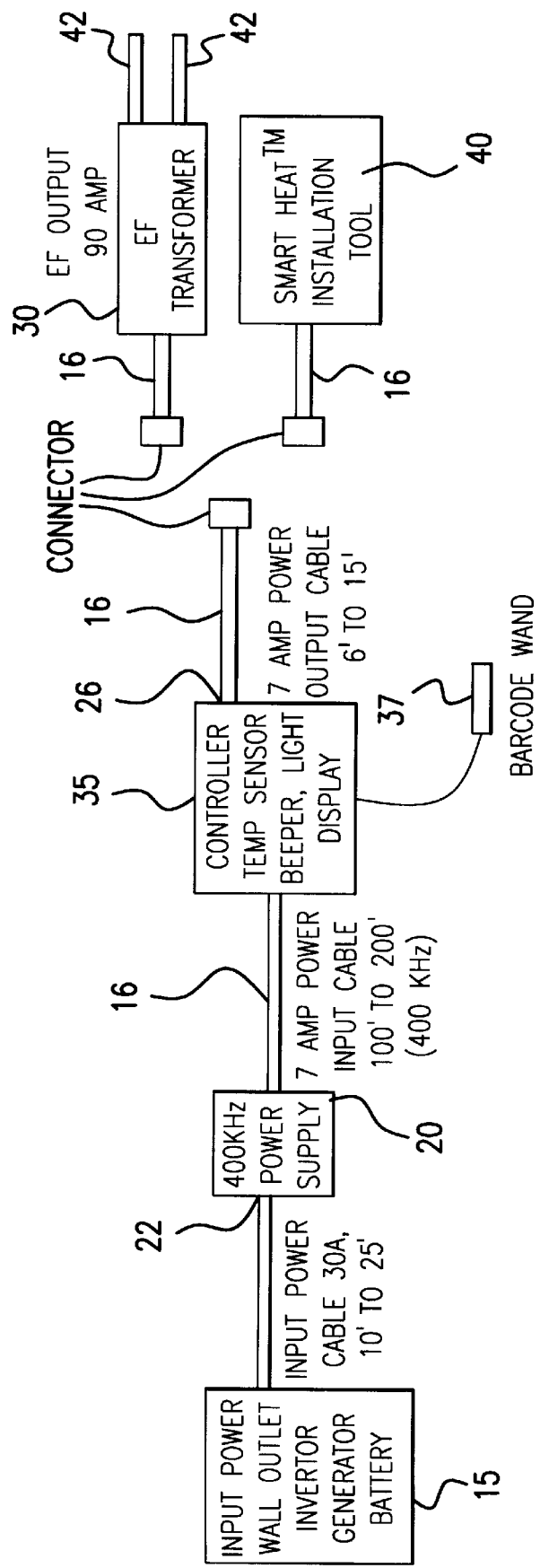
FIG. 2 is a block diagram of a method and apparatus for joining polyethylene pipe, according to one preferred embodiment of this invention, wherein a power supply provides a high frequency output power to ultimately energize either an electrofusion tool or an induction fusion tool.

In one preferred embodiment according to this invention, an AC power source 15 supplies the input power to power supply 20 at a relatively low frequency, such as a frequency in a range from about 0 Hz to about 75 Hz. In another preferred embodiment according to this invention, a DC power source 15 supplies the input power. Power source 15 preferably supplies power at a constant current and at a relatively low frequency. As shown in FIGS. 1 and 2, power supply 20 supplies the input power at a generally constant current of about 7 amps at about 500V. Frequency converter 30 can then convert the input power to an output power at a generally constant voltage between about 20V and about 48V.

In one preferred embodiment according to this invention power source 15 is a battery power source, such as a rechargeable battery pack. Conventionally available battery packs can supply a sufficient input power to input 22. In one preferred embodiment of this invention, a rechargeable battery pack supplies the input power at up to about 2,000 W. The converted output power is enough to fuse small couplings, tees, tee outlets, and other small fittings. The output power derived from a rechargeable battery pack can also be used with either induction fusion or electrofusion processes.

With power source 15 comprising a rechargeable battery pack, cable 16 is relatively short because the rechargeable battery pack can be positioned close to the installation site. Conventional AC power sources deliver the input power at a frequency of approximately 60 Hz whereas the input frequency of the method or the apparatus according to this invention can be in a range from approximately 0 Hz to approximately 75 Hz. Thus, the input power can have a frequency much less than 60 Hz.

A rechargeable battery pack can be relatively lightweight and can be used to perform approximately 80% of induction fusion or electrofusion operations that normally occur in the field. Larger rechargeable battery packs or other alternate power sources can be used to supply the input power necessary to fuse couplings or other fittings within an entire range of electrofusion fittings currently available, for example, which would require the input power to deliver approximately 80 Å at 3500 W.

Figure 3:
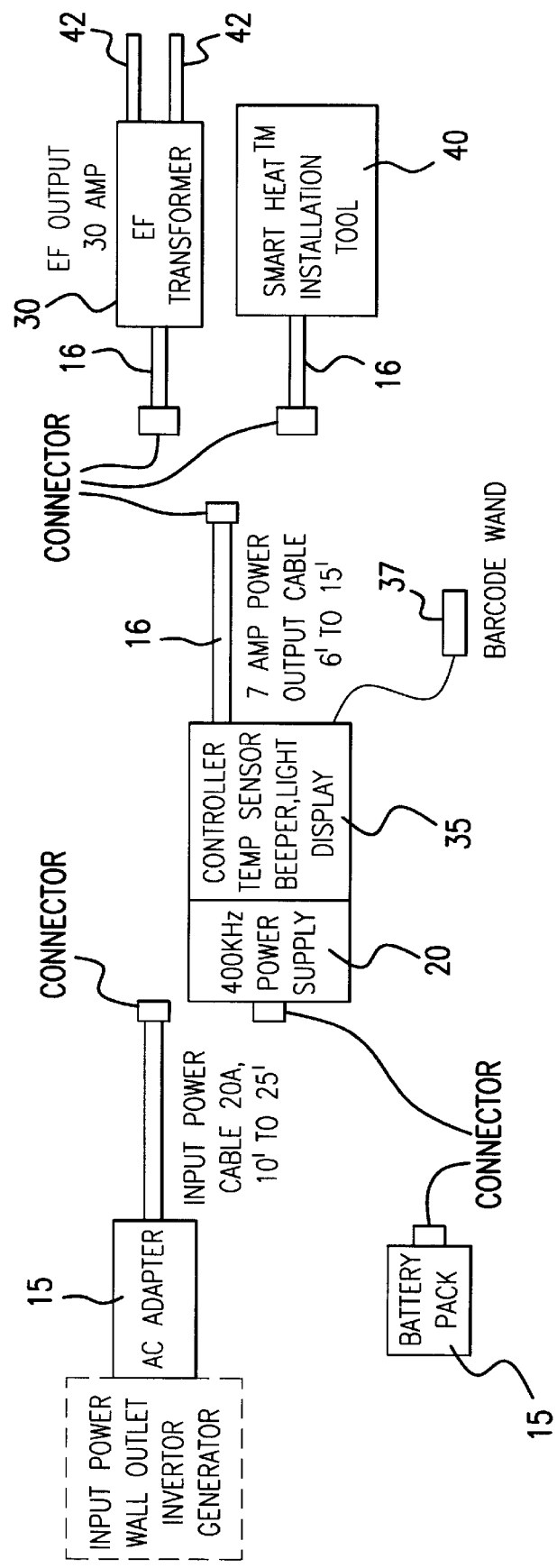
FIG. 3 is a block diagram of a method and apparatus for joining polyethylene pipe, according to another preferred embodiment of this invention, wherein either an AC adapter or a battery pack acts as a power source, and a high frequency output power is delivered to ultimately energize either an electrofusion tool or an induction fusion tool.

The input power is transferred to frequency convertor 30, preferably but not necessarily through output power switch 28, as shown in FIG. 1. As shown in FIGS. 2 and 3, frequency converter 30 converts the high frequency, such as 400 kHz, power delivered to leads 42 to an output power of either a constant voltage DC waveform or a constant voltage low frequency AC waveform. In one preferred embodiment according to this invention, the output power is delivered through cable 16 at the relatively high frequency in a range from about 380 kHz to about 420 kHz. The output power of frequency converter 30 is preferably delivered at a generally constant voltage, such as in a range between about 20V and about 48V. Depending upon the particular heat load demand at leads 42 of an electrofusion tool, the generally constant voltage output power can be set within the voltage range.

The output power is delivered through output 26, at the relatively high frequency, to installation tool 40 which is used to fusion join a segment of pipe, such as polyethylene pipe or pipe of another suitable plastic or polymeric material, to a coupling or another suitable fitting. In one preferred embodiment according to this invention such as shown in FIG. 2, the installation tool comprises an electrofusion tool with two leads 42. Different types of electrofusion tools are known to those skilled in the art of electrofusion methods for fusion joining. With a suitable electrofusion tool the output power is delivered to a plurality of leads 42 which are electrically connected to a heating element of the electrofusion tool. Conventional heating elements for electrofusion tools have two wires, leads, contacts or other electrical connections for electrically contacting corresponding leads 42 from the output power.

In another preferred embodiment according to this invention, installation tool 40 comprises an induction fusion tool, and the output power is delivered to an application tool that energizes the induction fusion tool. One preferred induction fusion tool is a SmartHeat™ coupler, T-fitting or the like which is commercially available from Uponor Aldyl Company, Mountain View, Calif. Such induction fusion tool positions an application tool about and generates induction around the coupling or other suitable fitting, to energize and thus transfer heat to the rigid heating element.

In one preferred embodiment according to this invention, the output power is delivered in a controlled fashion. As shown in FIGS. 1 and 3, controller 35, which may comprise any suitable microprocessor or other electronic control, can regulate the output power depending upon the heat demand of installation tool 40. In one preferred embodiment of this invention, temperature sensor 38 is exposed to an ambient surrounding installation tool 40. Thus, temperature sensor 38 may be positioned at or near installation tool 40. As shown in FIG. 1, temperature sensor 38 emits a signal to input 36 of microprocessor 35.

Input device 37 may comprise a barcode reader or barcode wand, for example. Many conventional installation tools or fittings now comprise a barcode which identifies the particular size, type and material of the installation tool or fitting. According to the method of this invention, input device 37 can be used to read the barcode and transmit information to controller 35. Controller 35 can then regulate the output power depending upon the type of installation tool 40 or corresponding fitting. For enhanced results, controller 35 can also be calibrated to vary the time duration or magnitude of the output power as a function of the ambient temperature surrounding installation tool 40. Thus, for example controller 35 may deliver the output power for a given time period if the ambient temperature is 70° F., and then can lengthen the time period for any ambient temperature below 70° F. or shorten the time period for any ambient temperature above 70° F.

Controller 35 may also comprise other control functions, such as automatic or manual on-off switches, start switches, light indicators, audible alarms or any other suitable control device known to those skilled in the art. In one preferred embodiment according to this invention, an audible alarm sounds, such as a beep or tone, when the fusion process is complete, which can be programmed as a function of the sensed ambient temperature surrounding installation tool 40.

An apparatus for accomplishing the method of joining polyethylene pipe, according to one preferred embodiment of this invention, comprises power source 15 providing the input power to input 22 of power supply 20. In one preferred embodiment of this invention, such as shown in FIG. 2, power supply 20 converts the low frequency input power and emits a high frequency output power through output 26 and through cable 27 or cable 16 which is electrically connected to installation tool 40. As shown in FIG. 1, cable 27 forms the electrical connection between frequency converter 30 and installation tool 40. As shown in FIGS. 2 and 3, cable 16 forms the electrical connection between power supply 20, which also converts the frequency, and installation tool 40. In one preferred embodiment according to this invention, cable 27 is about 6 feet to about 15 feet long. However, it is apparent that the length of cable 27 can vary to accommodate particular needs in the field. Controller 35 can be mounted in a relatively small container, casing or housing and easily transported to an installation site for a fusion joining process. Cable 27 can be relatively short because the container, casing or housing is positioned near the fusion site. Cable 16 can be up to 200 feet and even longer, depending upon the design of cable 16 and power supply 20. Cable 16 can be reduced in size because of a relatively high frequency, low current power emitted from power supply 20 and/or frequency converter 30. As previously discussed, power source 15 can emit either an AC or a DC power waveform.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A method of fusion joining polyethylene pipe with a coupling using an induction heating tool, the method comprising the steps of:

supplying an input power from a power source to an input of a power supply;

converting the input power to an output power at a high frequency;

delivering the converted high frequency output power to the induction heating tool at a generally constant voltage;

controlling the delivery of the output power using a controller sensing a heat demand of the induction heating tool; and operating the induction heating tool with the high frequency output power and generating an induction fusion between the coupling and the polyethylene pipe.

2. A method according to claim 1 wherein said power source is an AC source which supplies the input power at a low frequency in a range from about zero Hz to about 75 Hz.

3. A method according to claim 1 wherein said power source is a DC source which supplies the input power.

4. A method according to claim 1 wherein the output power at the high frequency is in a range from about 380 kHz to about 420 kHz.

5. A method according to claim 1 wherein the output power is delivered to a plurality of leads electrically connected to the induction heating tool.

6. A method according to claim 1 wherein the output power is delivered to an application tool for energizing the induction heating tool.

7. A method according to claim 1 wherein the input power is supplied at a generally constant current.

8. A method according to claim 1 wherein the delivery of the output power is controlled as a function of an ambient temperature sensed near a location of the induction heating tool.

9. A method according to claim 1 wherein a battery supplies the input power as a generally constant voltage DC waveform.

\* \* \* \* \*